United States Patent
Torng et al.

[11] Patent Number: 5,974,522
[45] Date of Patent: Oct. 26, 1999

[54] MACHINE FOR PROCESSING INTERRUPTED OUT-OF-ORDER INSTRUCTIONS

[75] Inventors: Hwa C. Torng, Ithaca, N.Y.; Martin Day, Toronto, Canada

[73] Assignee: Cornell Research Foundation, Inc., Ithaca, N.Y.

[21] Appl. No.: 08/028,757

[22] Filed: Mar. 9, 1993

Related U.S. Application Data

[63] Continuation of application No. 07/469,634, Jan. 24, 1990, abandoned.

[51] Int. Cl.⁶ .................................................. G06F 9/38

[52] U.S. Cl. ........................... 712/23; 712/215; 713/502; 710/267

[58] Field of Search ..................................... 395/250, 375, 395/800, 800.23, 391, 740, 557; 710/267; 712/215, 23; 713/502

[56] References Cited

U.S. PATENT DOCUMENTS

| | | | |
|---|---|---|---|
| 4,745,547 | 5/1988 | Buchholz et al. | 395/800.04 |
| 4,780,820 | 10/1988 | Sowa | 395/800.01 |
| 4,782,441 | 11/1988 | Inagami et al. | 395/800.09 |
| 4,807,115 | 2/1989 | Torng | 395/391 |

OTHER PUBLICATIONS

R.D. Acosta, "An Instruction Issuing Approach to Enhancing Performance in Multiple Functional Unit Processors" IEEE Transactions on Computers vol. C–25, No. 9, Sep. 1986.

*Primary Examiner*—Kenneth S. Kim
*Attorney, Agent, or Firm*—Salzman & Levy

[57] ABSTRACT

A processor having multiple functional units. The processor is capable of executing multiple instructions concurrently. An instruction issuing unit is connected to a mechanism for handling an interrupt of the processor. The interrupt handler has an instruction window (IW), which includes a vector element number (VEN) field that indicates the uncompleted elements to be executed. Upon termination of the interrupt, normal processing of the instruction issuing unit continues.

6 Claims, 6 Drawing Sheets

Figure 1

| Tag 32 | Instruction 34 | Vector Element Number 36 |
|---|---|---|
| | ••• | |

Figure 2

| | | 30a | 30b | 30c | 30d | 30e | 30f | 30g | 30h |
|---|---|---|---|---|---|---|---|---|---|
| | | 1 | 1 | 3 | 1 | 1 | 1 | 1 | | 36
| 32 | 1 | MULT R0, R1, R0 | | | | | | | |
| | 2 | ADD R2, R3, R2 | | | | | | | |
| | 3 | ADD VR0, VR1, VR0 | | | | | | | |
| | 4 | ADD R4, R5, R4 | | | | | | | |
| | 5 | ADD R6, R7, R6 | | | | | | | |
| | 6 | ADD R8, R9, R8 | | | | | | | |
| | 7 | ADD R10, R11, R10 | | | | | | | |

| 1 | MULT R0, R1, R0 | 1 |
|---|---|---|
| 3 | ADD VR0, VR1, VR0 | 2 |
| 4 | ADD R4, R5, R4 | 1 |
| 5 | ADD R6, R7, R6 | 1 |
| 6 | ADD R8, R9, R8 | 1 |
| 7 | ADD R10, R11, R10 | 1 |
| | | |
| | | |

Figure 6

| 3 | ADD VR0, VR1, VR0 | 1 | | | | |
|---|---|---|---|---|---|---|
| 5 | ADD R6, R7, R6 | 1 | | | | |
| 6 | ADD R8, R9, R8 | 1 | | | | |
| 7 | ADD R10, R11, R10 | 1 | | | | |

Figure 7

MACHINE FOR PROCESSING INTERRUPTED OUT-OF-ORDER INSTRUCTIONS

This is a continuation of co-pending application Ser. No. 07/469,634 filed on Jan. 24, 1990, now abandoned.

This invention was made with Government support under Grant No. F49620-87-C-0044, awarded by the Department of Defense Joint Services Electronics Program. The Government has certain rights in the invention.

RELATED PATENT:

This application is related to U.S. Pat. No. 4,807,115, issued to Hwa C. Torng and assigned to the present assignee for "Instruction Issuing Mechanism for Processors with Multiple Functional Units".

BACKGROUND OF THE INVENTION

The present invention relates to interrupt handlers and, more particularly, to interrupt handlers for processors having the capability of executing instructions out-of-order.

In the field of data processing, when multiple instructions are executed or issued concurrently within a given machine cycle, throughput is enhanced by the use of multiple functional units. An exemplary system for issuing multiple instructions concurrently is shown and described in the aforementioned U.S. Pat. No. 4,807,115, herein incorporated by reference. This positive effect on throughout due to issuing multiple instructions is improved to an even greater degree when instructions are issued nonsequentially.

Of course, to sustain multiple instruction issuances per machine cycle, the data path must be widened to carry more than one instruction at a time.

All processors are expected to handle interrupts promptly and efficiently. The three basic interrupt types encountered by processors are external interrupts, exception traps and software traps.

External interrupts are generated from or by the environment (i.e., from process control, transaction processing, a process time-out, a printer, a terminal or the like).

Exception traps are generated by occurrences of certain events in the system (i.e., divide by zero, overflow or illegal operations). In general, these traps require a program abort, and indicate a program error or a machine malfunction. In some cases, these traps are used as conditional processing. Therefore, an interrupt handler is written for each specific situation.

Software traps are instruction-initiated interrupt requests. These traps provide a basis for controlling certain software applications.

When an interrupt request is received, the processor must save its processor state precisely, then load and execute an appropriate interrupt handler. Upon completion of the interrupt handling routine, the saved processor state is restored and the interrupted process can then resume.

From the foregoing discussion, it is clear that a processor state should contain enough information so that the interrupted process can be restarted, preferably at the precise point where it was interrupted. To be able to resume an interrupted process, the processor state should include the contents of the general purpose registers, the program counter, the condition register, all index registers and the main memory.

Conventionally, in order to identify the point at which a process is interrupted, the address of a specific instruction, say instruction I, is saved when the processor state is saved. All instructions that precede instruction I have been executed, while instruction I and those following it have not been executed. Instruction I thus provides a precise interrupt point.

Due to the very nature of multiple instruction execution, however, two or more instructions at different stages of execution may be interrupted. It is thus an ongoing and particularly vexing problem to handle an interruption while retaining the benefits of calculations that have been completed. Although multiple interrupts may be received at the same time, they must be prioritized and handled one at a time, even though the interrupt handler itself may be interrupted.

As hereinabove mentioned, conventionally the specific instruction at which processing is temporarily halted is pinpointed. This is called a precise interrupt. Unfortunately, such a simplistic interrupt mechanism is not suitable for use with an out-of-order execution machine. Since instructions issued may not be contiguous in an out-of-order execution machine, a conventional interrupt handling mechanism simply will not be appropriate.

The Model No. 6600 system manufactured by Control Data Corp. maintains a scratch pad or "SCOREBOARD" to resolve dependency conflicts among instructions in an instruction stream, and to allow these instructions to complete out-of-order. The so-called "exchange jump" is the mechanism by which the CPU handles interrupts. If the exchange jump sequence is requested, the CPU is permitted to issue instructions up to, but not including, the next instruction word. All issued instructions are allowed to run to completion. The CPU registers are then interchanged with the data stored in the exchange package. The CPU is restarted at the location specified by the new contents of the program address register. Since the machine must wait for two instructions to be issued and completed before the interrupt can be serviced, on average this approach exacts a penalty in latency (the time between receiving an interrupt request and saving the processor state).

In the Model No. 360/91 system manufactured by IBM Corp., reservation stations and a common data bus (CDB) are employed to enhance performance. Upon receipt of a precise interrupt request or a trap, instruction decoding is temporarily halted and all issued instructions are allowed to complete, thereby resulting in considerable latency. If an imprecise interrupt is generated via internal processing, the state of the system is lost, in which case the system cannot be properly restarted.

In the case of the Model No. CRAY-1 system manufactured by Cray Research, Inc., when an interrupt is received, instruction issue is temporarily terminated and all vector and memory bank references are allowed to complete. The interrupt handler is loaded and executed in a similar manner to that employed by the aforementioned CDC Model No. 6600 system. The CRAY-1 processor must wait for two instructions to complete, on average, before the processor state can be saved. However, as the CRAY-1 processor supports complex vector operations, the latency (in cycles) between receipt of the interrupt request and subsequent exception processing may be longer than that of the CDC 6600 processor.

More recently, machines which allow out-of-order instruction issuance, concurrent execution and out-of-order instruction completion have been proposed. In the High Performance Substrate (HPS) system, the dynamic instruction stream is used to maintain a data dependency graph derived from an instruction window. Instructions are scheduled in a sequential manner and retired serially at a maximum rate of one per cycle. In order to respond to interrupt requests, checkpointing has been proposed to allow precise interrupt handling. The checkpoints are used to divide the sequential instruction stream into smaller units to reduce the cost of "repair". A minimum of two checkpoints and hence two additional states are required.

The foregoing approach degrades the performance of the system, both in processor speed and in the time required to restore to a consistent processor state upon receiving an interrupt request. The speed of the system, and thus its performance, is slowed down by the movement of state information as the states change, and by the additional read instructions which must precede all instructions that alter the memory. The memory must be adjusted to a consistent state every time an interrupt request is received.

One of the simplest precise interrupt mechanisms is the in-order instruction completion method, as discussed in "Implementing Precise Interrupts in Pipelined Processors" by J. E. Smith and A. R. Pleszkun, IEEE Trans. Computer, vol. C-37, no. 5, pp. 562–573 (May 1988). An instruction is allowed to modify the process state when all preceding instructions are certain to be allowed to complete. A reorder buffer is added so that instructions are permitted to complete out-of-order. Instructions are reordered before they are permitted to modify the process state. History buffer and future files can reduce performance degradation, but the additional registers and their requisite data paths impose added cost and exact a performance penalty.

It would be advantageous to provide a system for handling interruptions of a machine capable of processing out-of-order instructions.

It would be advantageous to provide a system for interrupt handling in a machine that processes two or more instructions concurrently.

It would also be advantageous to retain computations performed for each instruction of a group of instructions, executed concurrently, when the processor is interrupted while instructions are being issued out-of-order.

It would also be advantageous to be able to interrupt vector operations without losing any results obtained, or corrupting the calculations.

It would also be advantageous to restart a vector operation at the completion of the interrupt handling sequence.

It would also be advantageous to provide such a system having the attributes of short latency and relative simplicity.

SUMMARY OF THE INVENTION

In accordance with the present invention, there is provided a processor having multiple functional units. The processor has an instruction issuing unit for issuing multiple instructions concurrently. Connected to the instruction issuing unit is a mechanism for handling an interrupt of the processor. The interrupt handler has an instruction window (IW) which includes a vector element number (VEN) field that is set to a value that represents the number of vector elements remaining to be processed. The IW is based on the dispatch stack disclosed in the aforementioned U.S. Pat. No. 4,807,115.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

Figure 1:
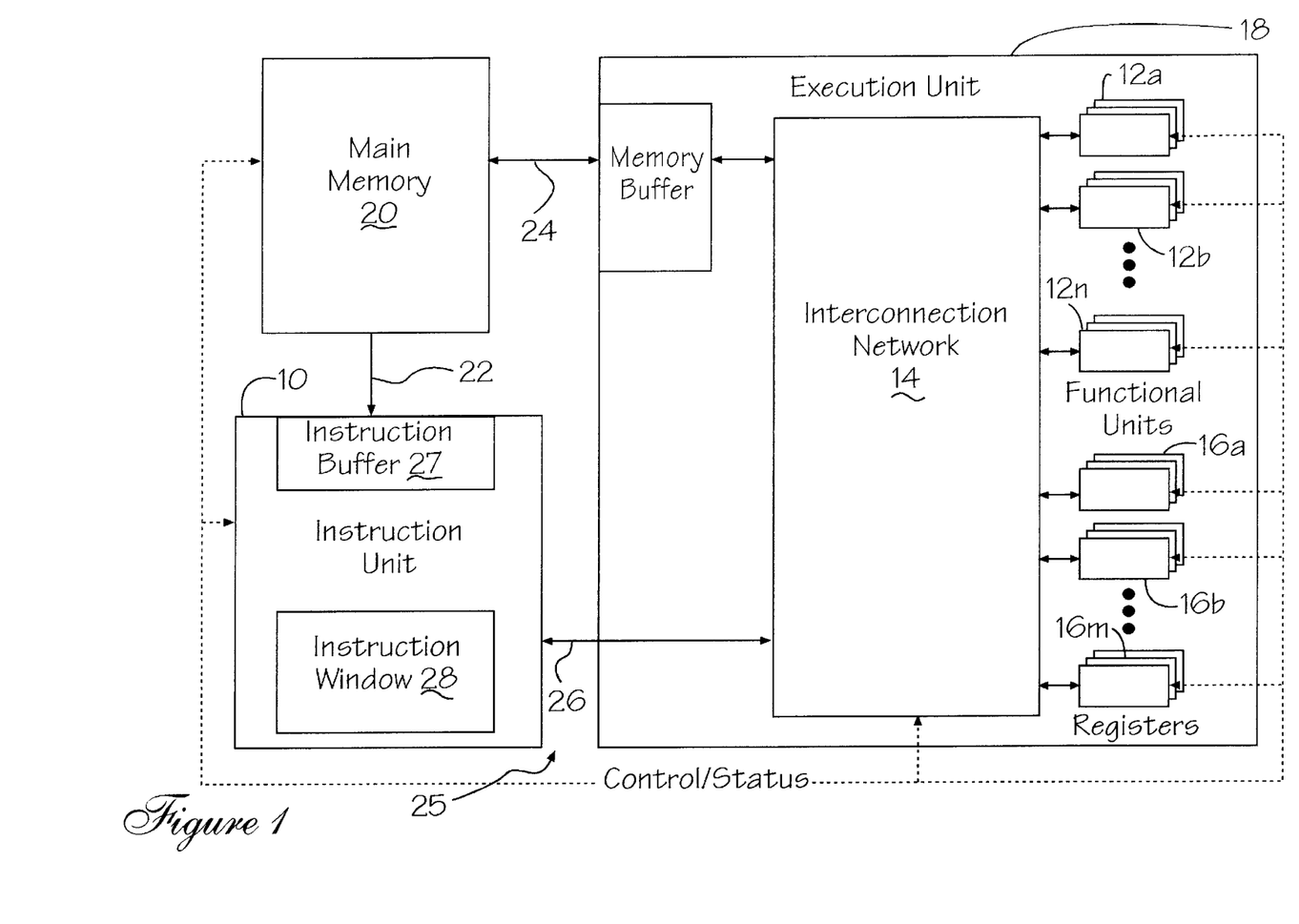
FIG. 1 is a block diagram of the multiple functional unit processor of the present invention.

Referring now to FIG. 1, there is shown a block diagram depicting the general structure of a processor with multiple functional units. An instruction unit 10 prepares incoming instructions, not shown, for execution, and issues the instructions to appropriate functional units 12a–12n across an interconnection network 14. Functional units 12a–12n operate on operands and produce results which are returned to appropriate registers 16a–16m across interconnection network 14.

Both instruction unit 10 and execution unit 18 are connected to a main memory 20 over data paths 22 and 24, respectively. Instruction unit 10 and execution unit 18 communicate with one another over data path 26. Together, instruction unit 10 and execution unit 18 form a processor, shown generally at reference numeral 25.

Figure 2:
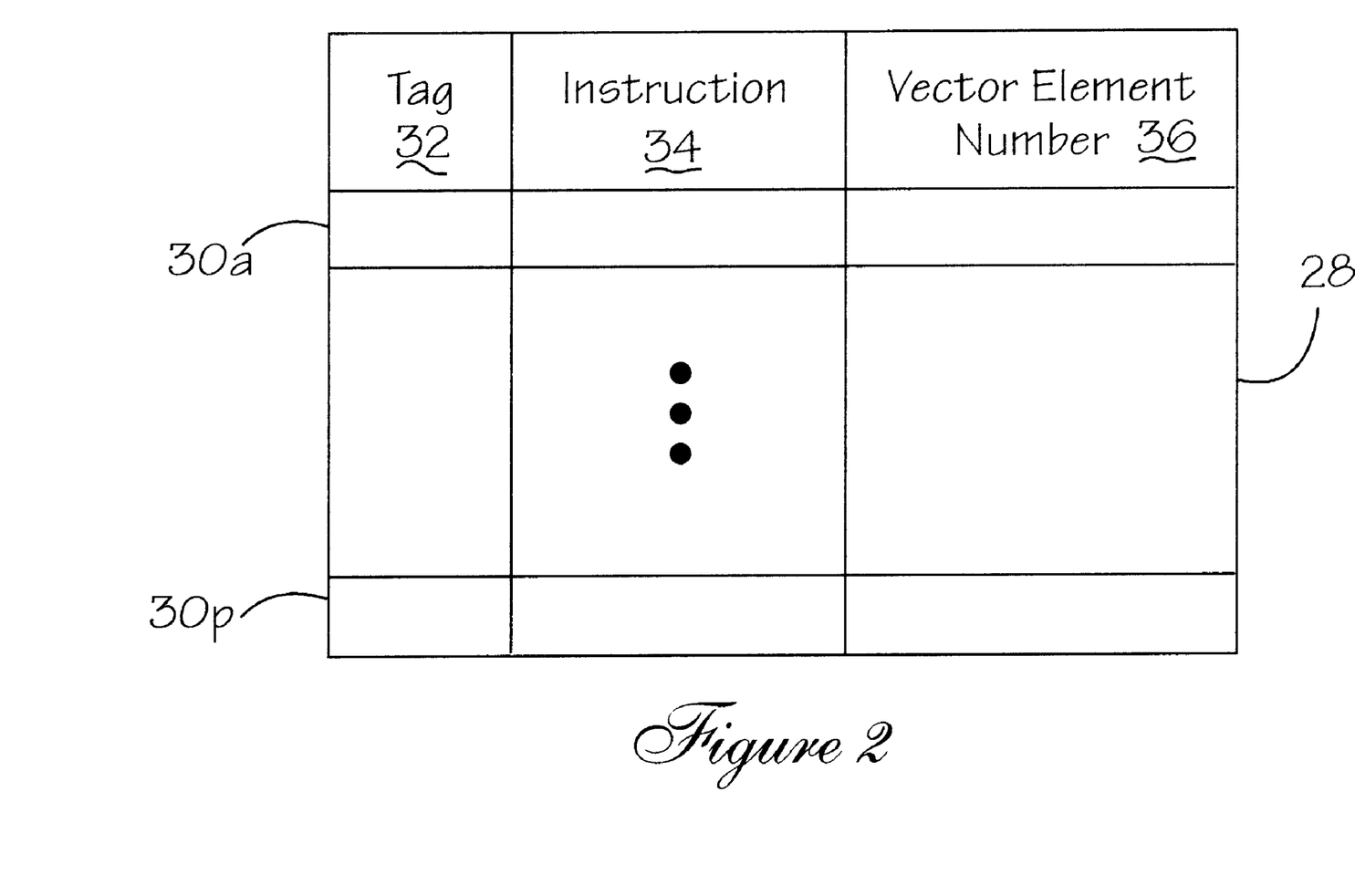
FIG. 2 is a diagram representing fields and cells of an instruction window (IW) of the present invention.

Instruction unit 10 also contains a buffer 27 and an Instruction Window (IW) 28, shown in greater detail in FIG. 2. IW 28 consists of a set of cells 30a–30p. The contents of a cell can be shifted into another cell in one or more clock cycles. One and only one instruction, not shown, occupies a cell and each cell contains three fields: tag 32, instruction 34, and vector element number (VEN) 36.

It can be seen that IW 28 is similar to a conventional dispatch stack, with one addition: the vector element number field 36. The dispatch stack effects multiple and out-of-sequence instruction issuances, as does IW 28. As hereinbelow described, IW 28 may also be incorporated to advantage with the conventional "at-most-one-instruction-per-cycle" machines in handling interrupt requests.

Tag field 32 contains a tag, not shown, uniquely identifying an instruction, not shown, held in that cell. The number of bits in the tag is sufficient to address any cell 30a–30p in IW 28.

Instruction field 34 contains a copy of the instruction as it was fetched from instruction buffer 27 (FIG. 1).

Vector element number (VEN) field 36 is set to a value equal to the number of vector elements, not shown, that have not yet been processed. The VEN 36 is obtained from the instruction 34 as it was fetched from main memory 20.

A three-operand format is used in the preferred embodiment for instructions, scalar and vector:

i: OP S1, S2, D, N where i denotes the instruction tag, OP the operation, S1 and S2 the registers used as sources, and D the destination register for the specified operation. Vector registers are specified hereinafter by a prefix "V". N specifies the number of vector elements to be processed and is always 1 for a scalar instruction. If the instruction OP is a vector instruction, VEN field 36 is set to N, the vector length specified in the instruction.

Figure 3:
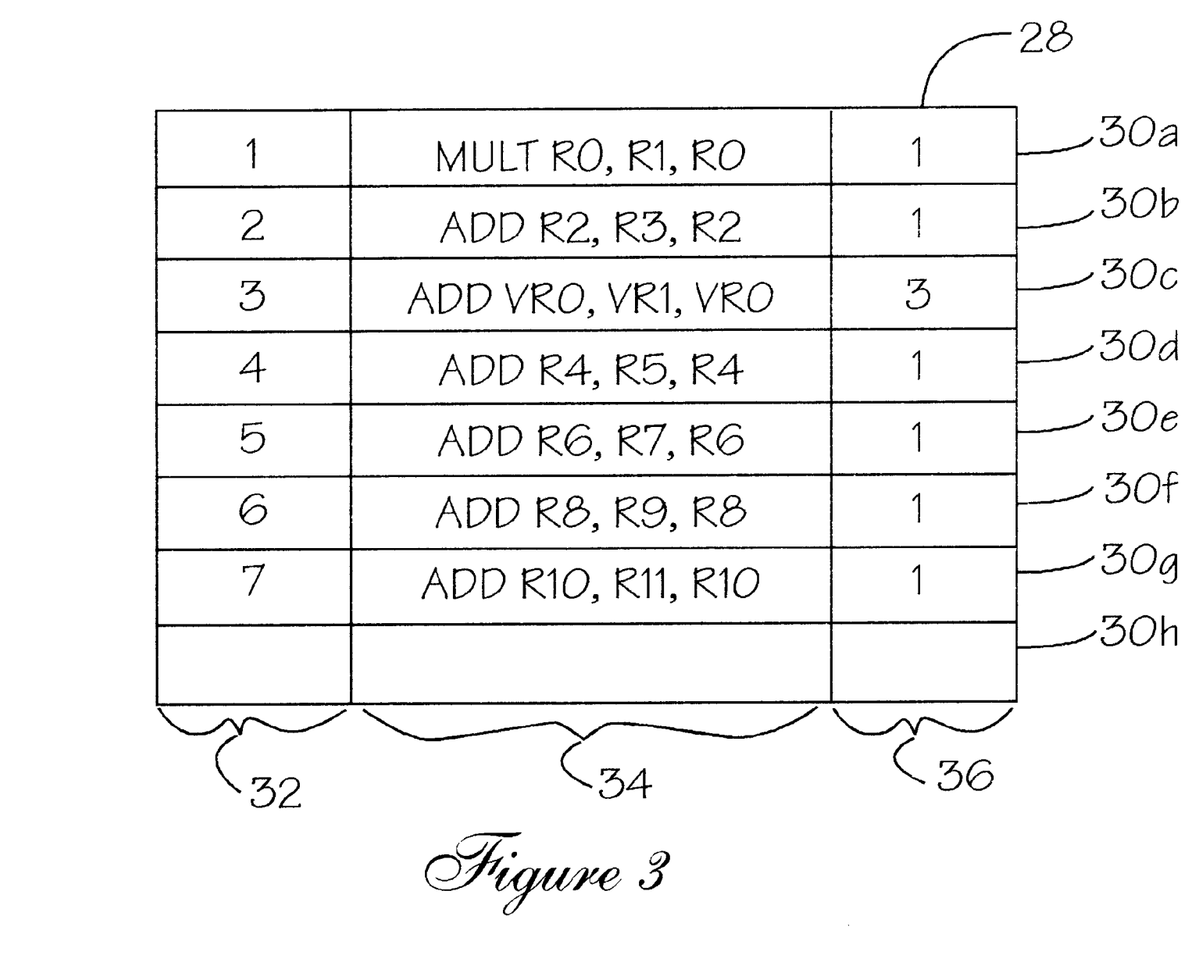
FIG. 3 is a diagram of an IW loaded with seven sample instructions.

As an example, a 7-instruction sequence is loaded in IW 28, shown in FIG. 3 after the sixth cycle.

Data dependencies among instructions in an instruction stream can be defined as follows. For instruction i, a domain and a range are defined:

domain registers: domain(i)=(S1, S2)

range registers: range(i)=(D)

If instruction j follows instruction i in an instruction stream, then conflict (i,j)=TRUE if and only if either:

1) range(i)∩domain (j)≠0
or 2) domain(i)∩range (j)≠0
or 3) range(i)∩range (j)≠0

(where ∩ denotes set intersection and 0 stands for empty set); otherwise conflict (i,j)=FALSE.

Once in IW 28 (FIG. 1), an instruction is decoded and issued if it is free of dependencies, data and resource. In a processor, an instruction issuance is delayed if any of the following conditions is true:

Condition 1: the required functional unit is busy;

Condition 2: no path across the interconnection network exists for the operands and/or result; or Condition 3: data dependencies exist for the instruction to be issued.

In conventional machines, at most one instruction is issued per cycle in sequential order. Only the top instruction from the instruction stream is examined at a time. If this instruction cannot be issued, then the instruction flow is stopped.

Using IW 28, where the size of the IW 28 is greater than one, performance enhancement is achieved by examining all pending instructions in the window for data dependencies. Several instructions which meet the aforementioned three conditions can be issued in the same machine cycle. Also, an instruction may be dispatched ahead of those which precede it in the instruction stream. Thus, multiple, out-of-order instruction issuances are implemented.

Three basic operations must be implemented on IW 28: load, issue and remove/update.

When a load operation begins, IW 28 has already pushed its remaining instructions to the top thereof and empty cells are found at the bottom.

When an instruction is loaded into IW 28, it is always placed at the topmost empty cell with a unique tag. Concurrently, the VEN is set to N, representing the number of vector elements of the given instruction. For a scalar instruction, VEN is always set to 1. The instructions freshly loaded into IW 28 follow the same order as the instruction stream.

Due to restrictions imposed by available data paths, the number of instructions that can be moved concurrently from the instruction buffer 27 to IW 28 is limited. An IW 28 can be appended to a machine which issues instructions sequentially at a rate of at most one per cycle.

A specific sequence of seven instructions is described herein to illustrate the operation of IW 28 and the mechanism, in accordance with the present invention, to handle interrupts. Of course, many other instruction sequences can be used, in place of this illustrative example, without departing from the scope of the invention. FIG. 3 shows the state of IW 28 after six cycles.

Hardware is provided so that instructions can be loaded into IW 28 from instruction buffer 27 at a rate of one per cycle. Both the scalar and vector add operations have a latency of three cycles. Pipelining assures that one add operation may be started and another completed every cycle. A scalar multiply operation requires six cycles and is not pipelined.

In cycle 1, instruction 1 is brought into IW 28 occupying the top cell 30a as shown in FIG. 3. In cycle 2, instruction 2 is loaded into IW 28. This process continues, loading one instruction into IW 28 per cycle, as long as there is room for an incoming instruction in IW 28. Starting in cycle 2, these loaded instructions are issued to the appropriate functional unit 12a–12n at a rate of one instruction per cycle.

At the beginning of each cycle, any instruction, which has an available functional unit 12a–12n, available interconnection paths and no data dependencies, is identified. Data dependencies can be determined using the instruction field of the occupied cells 30a–30p in IW 28.

Since the number of instructions which can be issued in a single cycle is bounded, the identified instructions may be issued in this cycle or in a later cycle. Preference is always given to those instructions closer to the top cell 30a of IW 28.

For each issued instruction, the contents of the cell 30a–30p containing the instruction being issued is passed to the assigned functional unit 12a–12n and actions are initiated to copy operands thereto from source registers 16a–16m.

Referring again to FIG. 3, instruction 1 is issued to the scalar multiplier, not shown, in cycle 2. Instruction 2 is issued to the scalar adder, not shown, in cycle 3. Instruction 3 is issued to the vector adder, not shown, in cycle 4. For each subsequent cycle, at most one instruction is dispatched to a functional unit 12a–12n.

Figure 4:
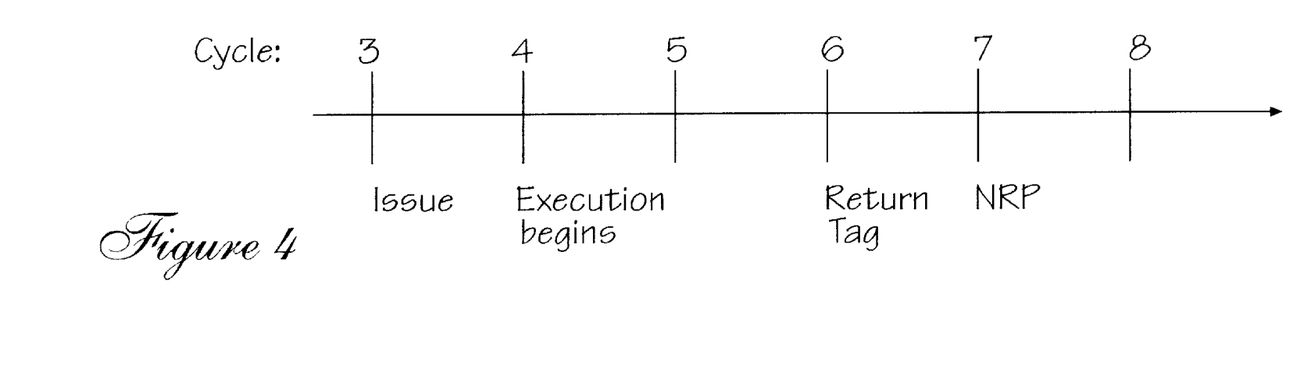
FIG. 4 is a simplified cycle timing diagram.

Referring now also to FIG. 4, there is shown an execution listing of instruction 2. Instruction 2 is issued in cycle 3 in this example. Starting in cycle 4, the pipelined scalar adder operates on its operands. Since the scalar adder has an execution latency of three cycles, it produces a result at cycle 7 and proceeds to deposit such result into the destination register, R2. When an instruction is about to deposit a result into the destination register, it has reached its No Return Point (NRP). For instruction 2, the NRP is at cycle 7. When an instruction reaches its NRP, it is allowed to complete; it should therefore be removed from IW 28. To accomplish this, the executing functional unit 12a–12n returns the instruction tag to IW 28 for identification.

Since it is assumed that only one cycle is required to transmit a tag from functional unit 12a–12n to IW 28, the functional unit 12a–12n returns the tag of an executing instruction to IW 28 one cycle before it reaches its NRP.

All cells 30a–30p whose tags match the returned tags are marked. Instructions residing in marked cells are then updated or removed.

An instruction in a marked cell 30a–30p is removed if its VEN value is 1. If the VEN value of a cell is greater than 1 when a tag is returned, then the VEN field 36 of the cell 30a–30p is decreased by 1.

Figure 5:
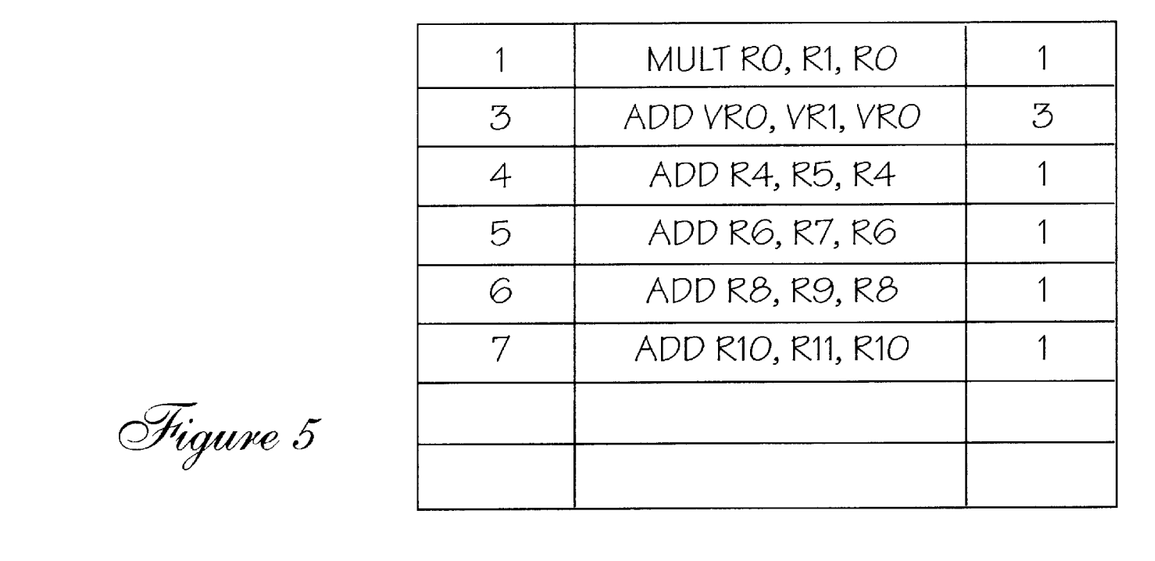
FIG. 5 is a diagram of the IW shown in FIG. 3 after cycle 7.

Refer now also to FIG. 5, which depicts the state of IW 28 after the seventh cycle. Since the start of cycle 7 is the NRP of instruction 2, its tag is returned to IW 28 during cycle 6. An associative search is then performed on IW 28 using the incoming tag as a key in cycle 7. Since the VEN value for instruction 2 is 1, during the remove/update operations of cycle 7, instruction 2 is eliminated. The remaining instructions are pushed to fill the top cells 30a, 30b, . . . of IW 28, preserving the order found in the instruction stream. Scalar register R2 is updated with the result produced by instruction 2.

Figure 6:
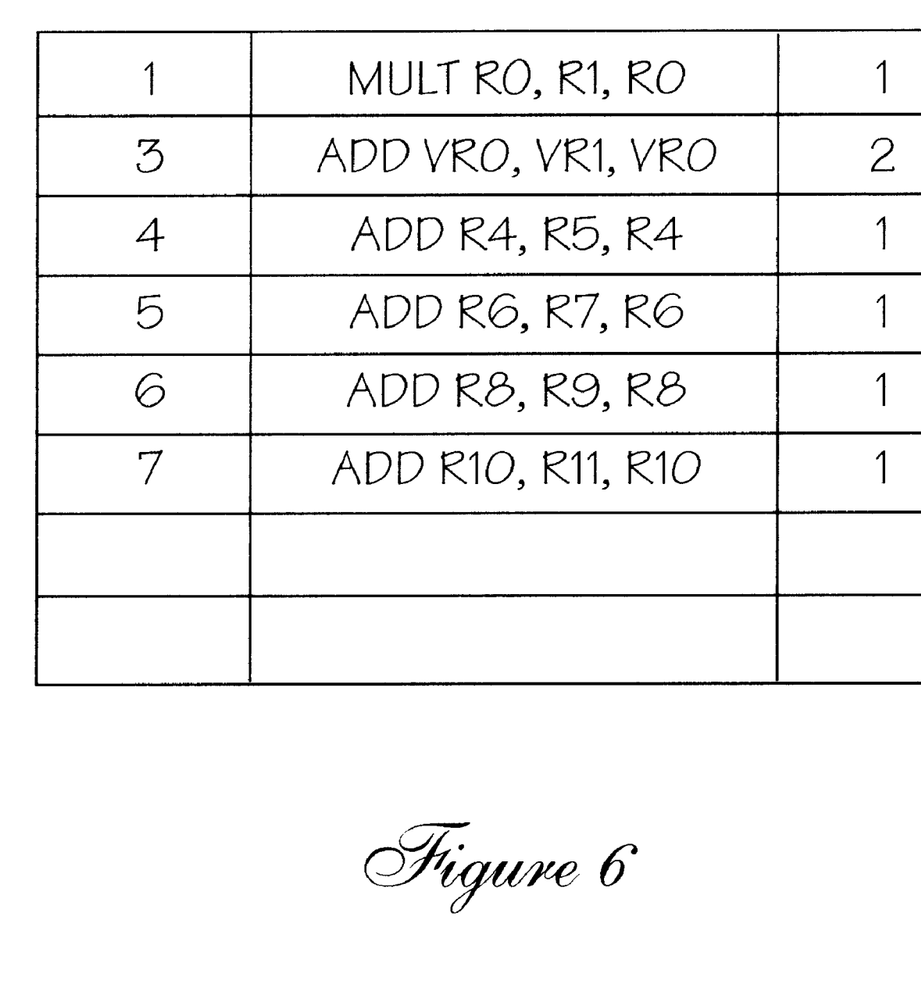
FIG. 6 is a diagram of the IW shown in FIG. 3 after cycle 8.

With reference to FIG. 6, which shows the state of IW 28 after the eighth cycle and with reference to instruction 3, the first element of the vector add instruction, issued in cycle 4, passes its NRP at the start of cycle 8. Thus, its tag is returned to IW 28 during cycle 7, and is matched with the tags in IW 28 at the beginning of cycle 8. Then, since the VEN value of instruction 3 is not equal to 1, the vector element number corresponding to instruction 3 is decreased by 1 during the remove/update operations of this cycle, as shown in FIG. 6. The presence of 2 in the vector element number field 36 indicates that two vector elements remain to be processed. Also, during cycle 8, the first element of VR0 is updated, and instruction 7 is issued to the pipelined scalar adder.

Upon the receipt of an interrupt request, the processor 25 (FIG. 1) responds as follows:

1) At the start of the cycle following the interrupt request, an Abort Signal is generated, and functional units 12a–12n are flushed. This eliminates all instructions which have not passed their NRPs. Any instruction which has passed its NRP is allowed to complete its execution by depositing its result into the appropriate destination register 16a–16m.

2) The instruction unit 10 is temporarily prevented from issuing instructions and waits for a single cycle to allow the instructions which have passed their NRP's to alter the processor state.

3) The processor state is then saved using an appropriate scheme, such as piggybacking, stack or register windowing. IW 28 is a component of the processor state, and so the contents of the occupied cells 30a–30p of IW 28 are also saved.

4) The appropriate interrupt handler, not shown, is fetched from memory 20 and executed by processor 25.

As hereinabove mentioned, IW 28 is included as a component of the processor state. The stored contents of IW 28 provide a modified "precise" interrupt point. Although IW 28 does not identify one instruction which defines the precise interrupt point, the group of instructions in IW jointly define the place at which the interrupted processing can resume.

Figure 7:
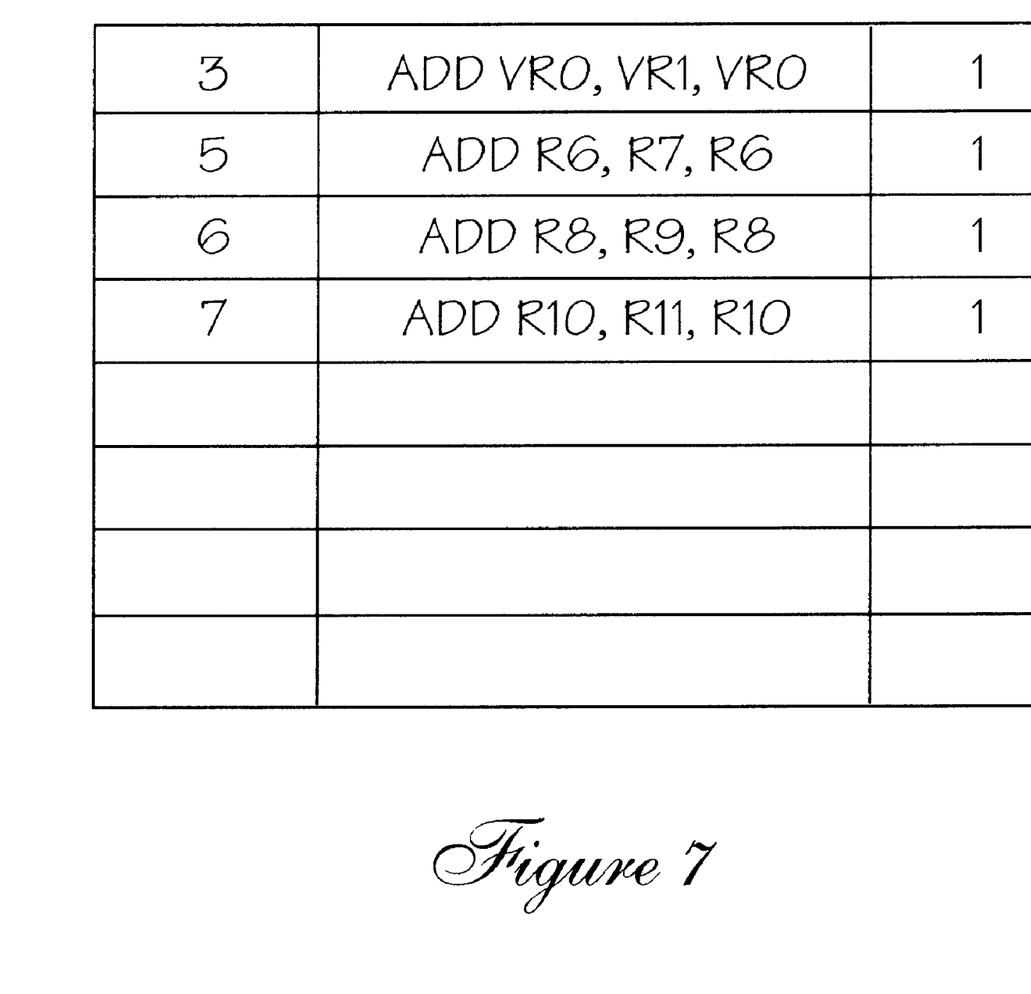
FIG. 7 is a diagram of the IW shown in FIG. 3 after cycle 9.

Referring now also to FIG. 7, which shows the state of IW 28 after the ninth cycle in the foregoing example, if an interrupt request is received during cycle 8, processor 25 generates the Abort Signal during cycle 9.

At the start of cycle 9, the second element of the vector add instruction (instruction 3), and scalar instructions 1 and 4 pass their respective NRPs. Thus the instructions bearing tags 1 and 4 are eliminated from IW 28 during cycle 9, and the vector element number corresponding to instruction 3 (formerly VEN=2) is decreased by 1.

Registers R0, R4 and the second element of the vector register VR0 are all updated by the execution of instructions 1, 4 and 3 respectively.

Moreover, in cycle 9, all functional units 12a–12n are flushed, thereby eliminating instructions which have not passed their NRPs. The maximum number of execution cycles wasted by flushing the functional units 12a–12n is the latency of the slowest functional unit.

A precise processor state is saved during cycle 10. In this example (FIG. 7), instructions 3, 5, 6 and 7 define jointly the "precise" interrupt point. Only the last element of the vector add remains to be processed when execution of the interrupted process resumes.

After completion of the interrupt handler, the original processor state, including the state of IW 28, is restored. That is, IW 28 is restored as shown in FIG. 7 at the completion of the interrupt handler.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A pipelining processor comprising a plurality of functional units and an instruction issuing unit operatively connected thereto for issuing multiple instructions concurrently and for allowing for the processing of instructions in an out-of-order sequence, said instruction issuing unit having means for handling an interrupt of said processor to facilitate continued operation upon said out-of-order instructions upon termination of said interrupt, said means for handling an interrupt detecting the number of instructions unissued at the time of said interrupt, said pipelining processor further comprising an execution unit, and said instruction issuing unit including an instruction window and an instruction buffer, said instruction issuing unit being operatively connected to said execution unit, said instruction window being adapted to store a value representative of a number of uncompleted instructions, so that when an interrupt to said processor occurs, previously issued instructions that have been interrupted and are hence uncompleted can be executed by said execution unit, said value providing a precise interrupt point for returning to an interrupted program by defining a precise interrupt boundary as said group of instructions in said instruction window.

2. The pipelining processor in accordance with claim 1 wherein said instruction window has a set of cells, each cell of said set of cells being capable of storing an instruction.

3. The pipelining processor in accordance with claim 2 wherein said each cell of said set of cells further comprises a vector element number indicative of an unprocessed vector operation.

4. The pipelining processor in accordance with claim 3 wherein said vector element number is decremented upon issuance of a corresponding instruction.

5. The pipelining processor in accordance with claim 3 wherein each cell of said set of cells further comprises an identifying tag.

6. The pipelining processor in accordance with claim 2 wherein said instruction issuing unit further comprises a buffer operatively connected to said instruction window for storing instructions prior to issuance thereof.

* * * * *